Patented Nov. 14, 1944

2,362,932

UNITED STATES PATENT OFFICE 2,362,932

STABLE STEROL DERIVATIVES

Hans R. Rosenberg, Wilmington, Del., and Howard F. Carroll, Camden, N. J., assignors to E. I. du Pont de Nemours & Company, Wilmington, Del., a corporation of Delaware No Drawing. Application July 2, 1942,
Serial No. 449,516

4 Claims. (Cl. 260—397.2)

This invention relates to a new class of crystalline addition compounds and processes for their production.

Various polyhydroxy sterols have been identified which are of particular value in the chemical and pharmaceutical fields. Certain of these sterols, such as 7-hydroxy-cholesterol, 7-hydroxy-sitosterol and 7-hydroxy-stigmasterol, are used in the production of valuable provitamins D. These polyhydroxy sterols are, however, very difficult to maintain in the pure form since they readily undergo deterioration and contamination if stored for any appreciable period of time. Likewise, they are difficult to obtain in the pure form and, as previously mentioned, once having been obtained in this form are even more difficult to maintain without deterioration and contamination. Because of their importance in certain fields it is essential that some means be devised whereby they may be purified and maintained in pure form over long periods of time and under widely varying conditions of storage.

It is an object of this invention to purify polyhydroxy sterols. A further object is to produce these compounds in such form that they may be stored for long period of time without contamination or deterioration. A still further object is to produce a new class of crystalline sterol derivatives. A still further object is to produce a class of crystalline 7-hydroxy sterol derivatives which may be maintained in their pure condition for appreciable periods of time and under conditions wherein the parent substances would rapidly deteriorate. Additional objects will become apparent from a consideration of the following description and claims.

These objects are attained in accordance with the herein described invention wherein crystalline addition compounds of polyhydroxy sterols with organic acids are produced. In a more restricted sense this invention is concerned with the production of crystalline addition compounds of 7-hydroxy sterols with organic acids, especially those acids of low molecular weight. In a still more restricted sense this invention is directed to the production of crystalline addition compounds of 7-hydroxy-cholesterol with organic acids containing two or three carbon atoms. In its preferred embodiment this invention pertains to the production of crystalline addition products of 7-hydroxy-cholesterol and acids such as acetic, oxalic, etc.; and the subsequent use of such compounds in the production of 7-dehydro-cholesterol.

The invention may be more readily understood by a consideration of the following illustrative examples wherein the quantities are stated in parts by weight.

Example 1

Three parts of 7-hydroxy-cholesterol are dissolved in 20 parts of acetic acid and heated to 55–60° C. with stirring, and the solution is then filtered. After cooling to room temperature, the addition compound of 7-hydroxy-cholesterol and acetic acid crystallizes out. This addition compound has a melting range from about 149–162° C. Analysis indicates that this compound contains two molecules of acetic acid per molecule of 7-hydroxy-cholesterol.

Example 2

One part of 7-hydroxy-cholesterol is dissolved in 30 parts of ethyl acetate, and 1 part of oxalic acid is added. The mixture is warmed up until solution is complete and then allowed to cool. The crystallized material is filtered off and air dried. It shows a melting range from about 140–145° C. Analysis indicates that this compound contains one molecule of oxalic acid per molecule of 7-hydroxy-cholesterol.

Example 3

One part of 7-hydroxy-cholesterol-3-monobenzoate and 1 part of oxalic acid are dissolved in 30 parts of ethyl acetate and warmed on the steam bath until the entire material goes into solution. Upon cooling, the addition compound crystallizes out and is filtered off. The compound has a melting range from about 140–155° C. Analysis indicates that the compound contains two molecules of 7-hydroxy-cholesterol-3-monobenzoate per molecule of oxalic acid.

It is to be understood that the above examples are representative merely of the present invention. They may be varied widely with respect to the individual reactants, the amounts thereof, and the conditions of reaction without departing from the scope of this invention.

In place of or in addition to 7-hydroxy-cholesterol and/or its 3-monobenzoate it is to be understood that a great number of other sterol compounds or mixtures thereof may be used. These sterols should preferably contain a free hydroxyl group in the 7-position. A representative few of the sterols coming within this category are 7-hydroxy-sitosterol, 7-hydroxy-stigmasterol, and 7-hydroxy compounds from the androstane and pregnane series.

The invention is not, of course, limited to sterols containing but two hydroxy groups since in its secondary embodiment it is also applicable to sterols and their derivatives which contain three or even more hydroxy groups. Likewise, it is not restricted to hydroxylated cholesterols and their substitution products but embraces within its scope numerous other polyhydroxy sterol derivatives which occur naturally in plants and animals or which may be derived therefrom by physical and chemical methods.

One or more of the hydroxy groups of the sterol may be esterified with one or more organic acids before formation of the herein-described addition compounds. It is understood, of course, that at least one hydroxy group remains after such esterification to form the addition compounds hereof.

Addition agents capable of forming stable compounds in accordance with this invention are exceedingly numerous. Most aliphatic and aromatic acids form these addition compounds. However, some of the higher molecular weight acids form addition compounds which do not crystallize as well as the acids of lower molecular weight. Consequently it is to be understood that acids of lower molecular weight are to be preferred, and in particular aliphatic acids containing two or three carbon atoms, such as acetic, oxalic and propionic acids.

In its preferred embodiment the present invention is particularly directed to the treatment of 7-hydroxy sterols with aliphatic organic acids containing two or three carbon atoms in the molecule. Examples of compounds coming within the scope of this preferred embodiment are 7-hydroxy-cholesterol and its derivatives converted to addition compounds with organic acids such as acetic, oxalic and/or propionic acids. It is possible, as previously mentioned, before producing such addition compounds to first esterify the hydroxyl group occurring on the 3-position with an esterifying agent. Example 3 hereof represents a procedure of this type.

It is contemplated that one or more sterols may be treated with one or more organic acids in accordance with the preceding instructions to produce mixtures of addition compounds. For certain purposes mixtures of these addition compounds may be superior to any of the individual components.

Addition compounds formed in accordance with this invention are readily separated from the impurities with which the parent sterol was associated. Likewise, they are surprisingly stable and may be stored for long periods of time without deterioration. After purification or storage it is generally desirable to convert them to the pure parent sterol. This may be accomplished by treatment with an acid-binding agent such as sodium bicarbonate or an amine. It may likewise be accomplished by dissolving the addition compound in ether and treating it with an aqueous solution of caustic soda or some other alkali.

By means of the present invention it is possible to purify polyhydroxy sterols and to maintain the pure compounds unchanged over extended periods of time. 7-hydroxy-cholesterol and other 7-hydroxy sterols may thereby be obtained in extremely pure and stable crystalline form. In this manner, they may be readily separated from the impurities with which they were originally admixed. Furthermore, these crystals may be preserved unchanged in storage, and provide a convenient and economical method of storing valuable intermediates of this general type. When it is desired to produce the parent hydroxy-cholesterol from the crystalline addition compound this may be speedily and economically accomplished and the resulting product used for the production of provitamin D or for any other desired purpose.

As many apparently widely different embodiments of this invention may be made without departing from the spirit and scope thereof, it is to be understood that the invention is not limited to the specific embodiments thereof except as defined in the appended claims.

We claim:

1. Crystalline addition compounds of 7-hydroxy sterols and an organic acid of two carbon atoms.

2. Crystalline addition compounds of 7-hydroxy cholesterol and an organic acid of two carbon atoms.

3. Crystalline addition products of 7-hydroxy cholesterol and acetic acid.

4. Crystalline addition products of 7-hydroxy cholesterol and oxalic acid.

HANS R. ROSENBERG.
HOWARD F. CARROLL.